United States Patent [19]

Egly

[11] Patent Number: 4,759,443

[45] Date of Patent: Jul. 26, 1988

[54] ACCESSIBLE ELECTRONIC MEDIA STORAGE CASE

[76] Inventor: Robert A. Egly, 31 Belcourt South, Newport Beach, Calif. 92660

[21] Appl. No.: 846,211

[22] Filed: Mar. 31, 1986

[51] Int. Cl.$^4$ ............................................. B65D 85/00
[52] U.S. Cl. .................................... 206/425; 206/309; 206/444
[58] Field of Search ............... 206/309, 425, 444, 449, 206/451, 555, 454, 456, 455

[56] References Cited

U.S. PATENT DOCUMENTS

| | | | |
|---|---|---|---|
| 3,902,595 | 9/1975 | Mori | 206/425 |
| 4,295,599 | 10/1981 | Locatelli et al. | 206/425 |
| 4,505,388 | 3/1985 | Solomon | 206/425 |
| 4,519,893 | 5/1985 | Olas | 206/425 |
| 4,538,730 | 9/1985 | Wu | 206/425 |
| 4,634,001 | 1/1987 | Wakelin | 206/425 |

*Primary Examiner*—Joseph Man-Fu Moy
*Attorney, Agent, or Firm*—George F. Bethel; Patience K. Bethel

[57] ABSTRACT

The disclosure herein sets forth a closed electronic media container having a hinged top portion and a bottom portion with a partially removable frontal wall. The hinged top portion is hinged to the bottom portion along a truncated interface sloping from the back to the front to expose electronic media therein. The top portion rests on the bottom portion when it is canted backwardly on an interfacing surface. The frontal wall breaks away from the angular corners of the side walls on the bottom portion of the container on a flexed resilient basis to expose electronic media therein and is retained by two ledges on either side of the bottom portion of the container in tightened juxtaposition thereto, after cooling of the unit when it is injection molded and the frontal wall is inserted therein for frictional engagement.

13 Claims, 3 Drawing Sheets

U.S. Patent   Jul. 26, 1988   Sheet 1 of 3   4,759,443
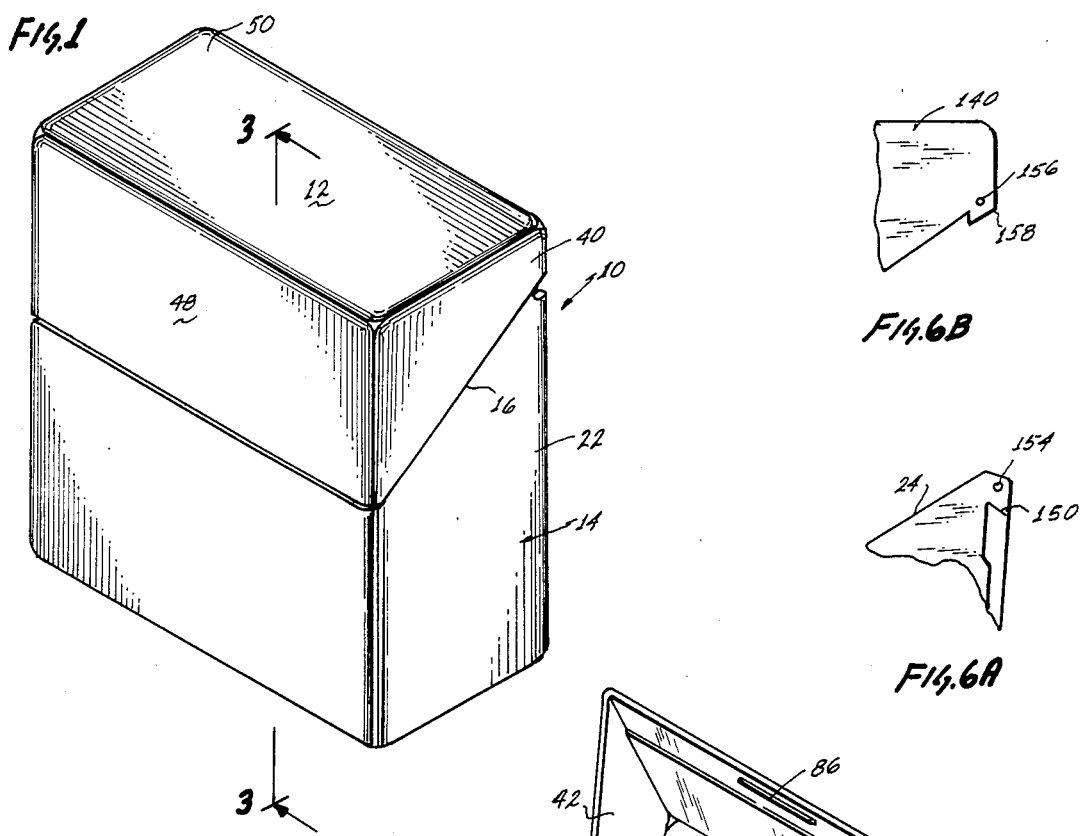
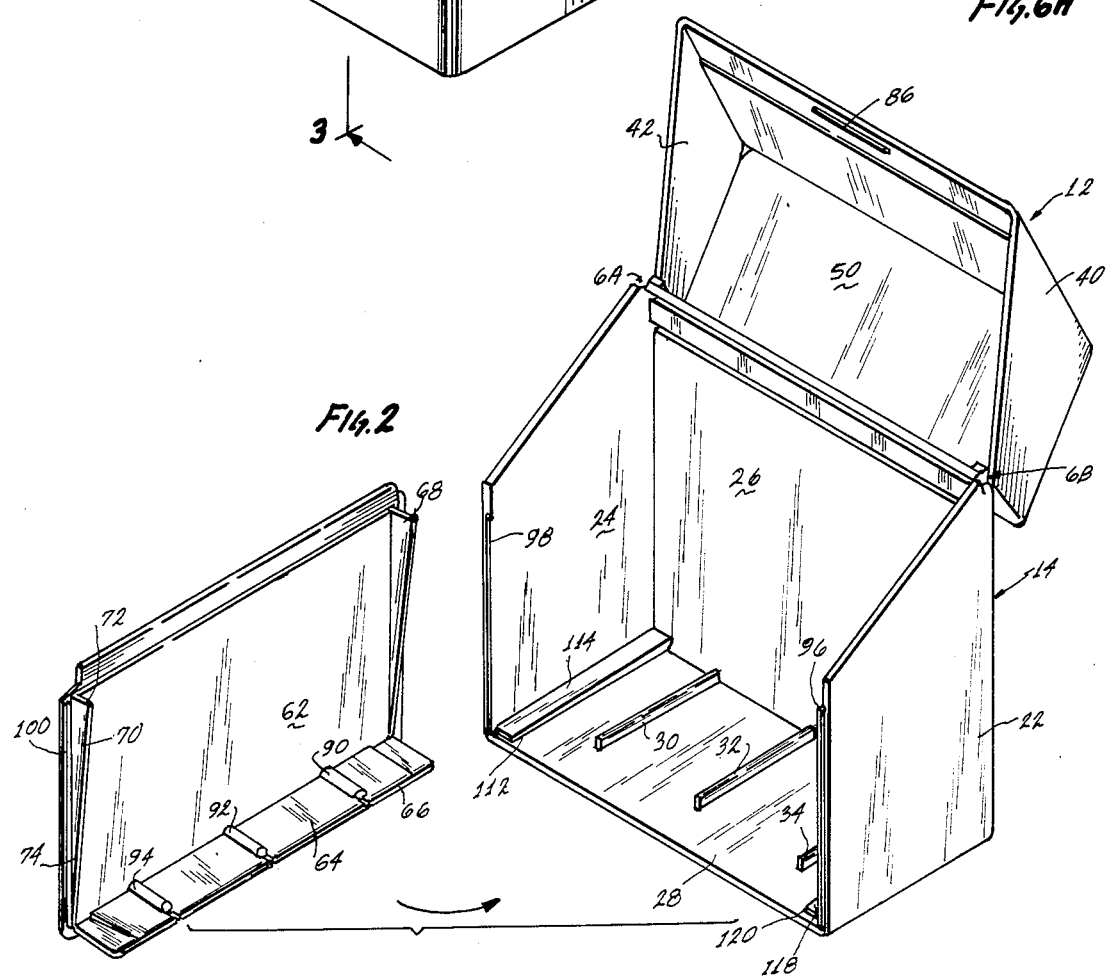

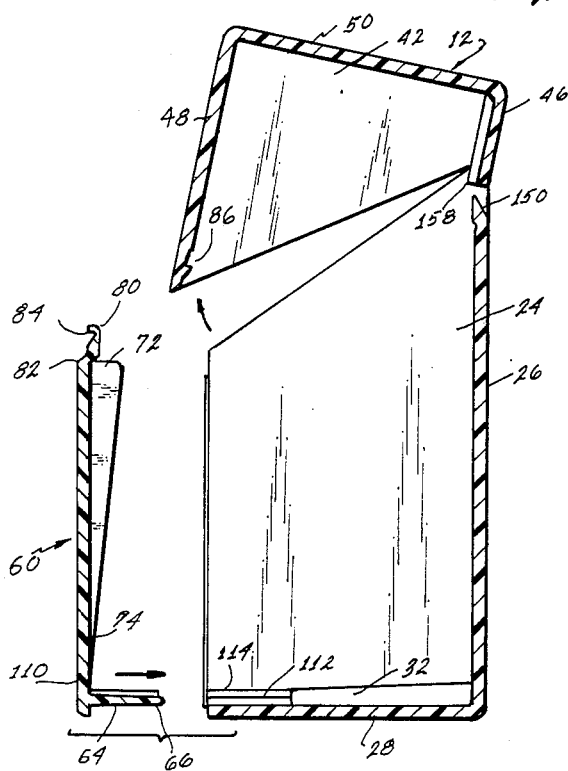
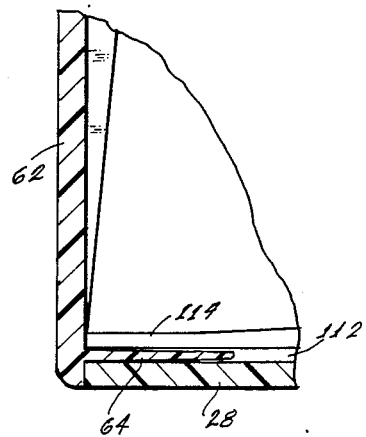
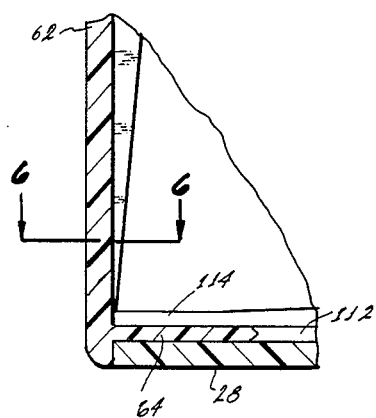
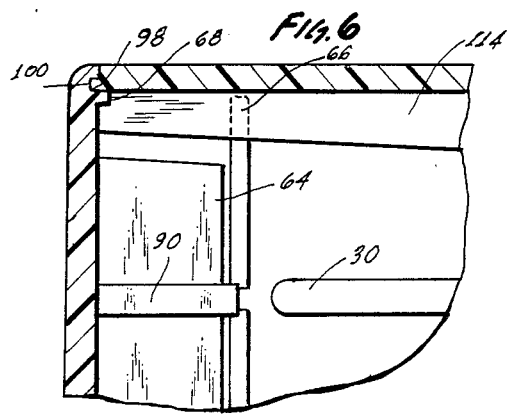

ACCESSIBLE ELECTRONIC MEDIA STORAGE CASE

FIELD OF THE INVENTION

The field of this invention lies within the field of electronic media storage. More particularly, it lies within the field of storage cases for electronic media such as floppy disks. The electronic media can be stored within the container for prevention of damage, dust accumulation and is generally accessible for view by a user before insertion into a disk drive.

DESCRIPTION OF THE PRIOR ART

The prior art pertaining to electronic media disk storage relates to various types of containers. Some of these containers, the inventor hereof has invented in the past and are described in U.S. Pat. Nos. Des. 251,273, 4,225,038, 4,289,235, 4,369,879, 4,449,628, and Des. 280,262.

All the foregoing patents and prior art generally relate to accessible electronic media storage devices. However, many prior art electronic media storage cases did not allow for access to the electronic media through either a proper view or a removal thereof in a facile manner without the entire removal of each particular disk. For instance, the electronic media of the prior art was generally accessed for viewing purposes by removing the electronic media and observing each particular disk out of a collection of disks. This can be time consuming and inordinately cumbersome.

Other electronic media disk access means provided for opening a container and revealing the disk material that was held in a rack or on a ledge. This was a substantially improved method over the prior art at the time and is still vastly superior to other means for accessing electronic media.

The invention hereof is a further improvement in a particular area of magnetic disk storage. The invention provides for an injection molded container that is completely closed and surrounds the electronic media. The injection molded container has a truncated bottom portion which allows for view of electronic media implaced in the container. The ability to view the media through the truncated angular exposure thereof provides for substantially improved access and a view of the electronic media.

In addition to the foregoing, the invention incorporates a hinged top portion. The hinged top portion is hinged on pintals on either side which are received within dimples on the top. This allows for hinged movement of the top portion in a facile manner on a hinge support which readily provides opening and closing of the top portion on the base of the container.

In addition to the foregoing features, the hingepoint along the interface between the bottom portion of the container and the top portion is allowed to move backwardly to an angled portion on the bottom portion of the container which provides a stop and also allows movement of the top portion against the bottom portion of the container.

The invention further comprises a front wall on the bottom portion of the container which flexes outwardly for access of electronic media viewing. In effect, the front wall pulls away from the side walls of the bottom portion of the container so that viewing can take place of any material in the container. The front wall has indexing splines which are received interiorly of the side walls of the bottom portion of the container and are held therein in an indexed manner.

During the manufacture of the container, the parts are injection molded in three particular portions. The base of the bottom portion of the container is molded with ridges on the bottom for providing facile movement of electronic media on the base. Also, ledges on either side cooperate with the ridges in order to allow for support of electronic media on the base of the container on the bottom thereof.

The frontal wall has matched ribs which slide into an indexed relationship with the ribs on the bottom of the base of the container. Furthermore, the frontal wall has an L-shaped section which projects underneath the supporting ledge and is held therein.

During the manufacture of the injection molded parts, the inside dimension between the ledge and the base of the container is of a larger dimension when it is warmed before cooling. This allows for the L-shaped extension to be implaced under the ledge. After cooling and contraction of the inside dimension between the ledge and the bottom of the container, the frontal wall is held in tightened engagement therewith by virtue of the frictional holding of the L-shaped portion under the ledge.

The foregoing configuration allows for splined joindure and pintal engagement of the entire container for ready and easy assembly and at the same time secure maintenance thereof. As a consequence, the invention is a substantial step over the prior art in many respects, including not only the configuration for maintenance of electronic media, but also the general manufacturing aspects thereof.

When referring to electronic media in this application, the reference refers to all electronic storage means. These include laser and optical recording means and disks. It also extends to audio disks and digital recording means. Thus, the floppy disks of the known art as well as those 3½ inch disks in hard cases or shells are also included in the term electronic media hereof.

SUMMARY OF THE INVENTION

In summation, this invention comprises a truncated container having a bottom portion and a top portion which is in split truncated relationship providing access while at the same time having a break-away frontal wall for spanning and viewing electronic media therein.

More specifically, the invention comprises a container having a bottom portion or a lower portion. The container is rectangularly configured in its closed position and has a top portion. The top portion is hinged to the bottom portion by means of a pintal hinge engagement. The pintal hinge engagement incorporates two pins which extend from the side walls of either the bottom or top portion of the container and are received within respective dimples or openings.

The bottom portion has an angular recess in the rear wall thereof so that as the top portion is hinged backwardly it is received therein and is stopped thereby.

The rectangular container has its top and bottom portions truncated so that electronic media can be viewed from the front to the back by spanning or flexing electronic media within the container and viewing it. This action is further enhanced by a breakaway frontal wall. More particularly, the frontal wall is flexibly attached to the front edges of the side walls of the bottom portion of the container so that it can be flexed outwardly for a view of electronic media within the container. The outward flexing allows for a view, while at the same time providing for maintenance of the electronic media after it has been flexed away by resiliently bending backwardly against the media.

The frontal wall has an L-shaped portion at the base. The L-shaped portion at the base is received within ledges of the bottom portion of the container. This is accommodated by a frictional engagement which is enhanced after cooling of the container after injection molding so that the inside dimension of the ledge contracts to hold the L-shaped portion of the front wall of the container therein.

The front wall of the container is further enhanced by indexing splines which are received interiorly of the side walls of the lower portions of the container. Furthermore, the electronic media is supported on ridges in the base of the container, as well as the surfaces of the ledges in which the L-shaped portion is received.

The entire container is closed and locked by means of a projection or tongue which is received within an opening in the front wall for locking the entire assembly together.

The foregoing constitutes a substantial step over the prior art by allowing for a facile and ready access of electronic media through spanning and viewing of electronic media within a container which can be opened providing a truncated view and a breakaway front wall which is manufactured in a unique and substantially superior manner over that of the prior art.

BRIEF DESCRIPTION OF THE DRAWINGS

The invention will be more clearly understood by reference to the description below taken in conjunction with the accompanying drawings wherein:

FIG. 1 shows a perspective view of the electronic media storage container of this invention in its closed configuration.

FIG. 2 shows the container of this invention with the front wall broken away prior to being inserted into the container and with the top flipped backwardly against the angular ledge upon which it is stopped and rested.

FIG. 3 shows a sectional view in the direction of lines 3—3 of FIG. 1, with the front wall broken away and the top slightly opened.

FIG. 4 shows a detailed view of the corner of the container shown in FIG. 3 immediately after the injection molding process when the base portion is warm and the front wall "L" section is inserted with a gap between the interior portions thereof.

FIG. 5 shows the same view as FIG. 4 after the product has cooled and the L-shaped portion of the front wall is secured in place under the ledge in a tight frictional engagement.

FIG. 6 shows a view looking downwardly at the corner portion of FIG. 5 in the direction of lines 6—6 of FIG. 5.

FIG. 6A shows a view of the pintal hinge portion of the connection of the lid or top portion to the base portion of the container with the pintal thereof.

FIG. 6B shows a view of the top portion where the dimple portion is shown which receives the pintal of the side walls of the lower portion of the container.

DESCRIPTION OF THE PREFERRED EMBODIMENTS

Figure 7:
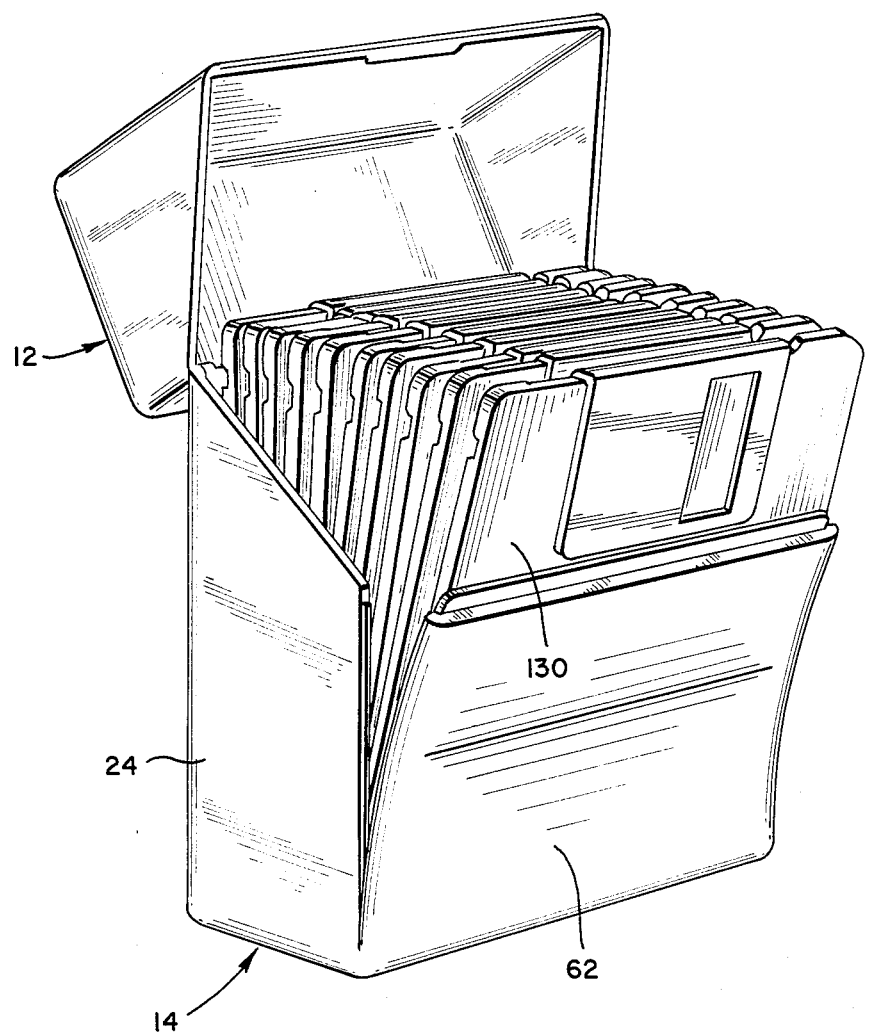
FIG. 7 shows the container with electronic media therein wherein the front wall is being flexed so that the electronic media can be viewed.

Looking at FIG. 1, it can be seen that a container 10 is shown having a top portion 12 and a lower portion 14. The respective top portion and lower portion 12 and 14 are joined together at a hinge point which will be described hereinafter. In the closed position, the top portion 12 and the lower portion 14 provide for a rectangular container having somewhat rounded edges as can be seen by the shading.

The two portions are split from each other along a break point 16. The break point is a truncated interface wherein the bottom portion slopes from the back to the front from a higher point to a lower point, while the top portion 12 slopes from the back to the front downwardly so that it slopes from a smaller portion to a larger portion.

The bottom portion of the container is formed with two side walls 22 and 24. The side walls 22 and 24 respectively are joined by a back wall 26. The back wall 26 terminates in a base 28 which also joins the side walls 22 and 24. The base 28 has three rib portions 30, 32 and 34. The rib portions 30, 32 and 34 are such wherein they receive electronic media supported thereon in conjunction with ledges which will be expanded upon hereinafter.

The top portion 12 is comprised of a side wall 40 on one side and a second side wall 42 on the other side. The side walls 40 and 42 terminate in a lesser back wall 46 and a front wall 48. The respective back and front walls 46 and 48 are formed with a top 50. Side walls 40 and 42 are truncated from the back wall 46 to the front wall 48 in a downward sloping manner from the minor wall portion 46 to the major wall portion 48 so as to form a truncated angular cut with the top portion 12.

The bottom portion 14 of the container has side walls 22 and 24 that are angularly cut from a high portion of the back wall 26 to the frontal portion, which will be expanded upon hereinafter, in a downwardly angular manner so as to provide access to media implaced therein.

FIGS. 2 and 3 show a front wall 60. Front wall 60 comprises a frontal portion 62 that is formed in an L-shaped with an extension 64. The extension 64 is tapered at a leading edge 66 thereof so that it is narrower at the point where it is inserted than it is in the intermediate and end portion where it joins the upright wall 62. This L-shaped configuration enables the wall 60 to be inserted and held in place in the manner to be described.

The front wall member 60 incorporates a pair of angular splines 68 and 70. The angular splines 68 and 70 provide indexing at the interior edge regions of walls 22 and 24. These angular splines extend from an expanded portion 72 to a narrow portion 74. This serves to enhance the ability of the splines 68 and 70 to be indexed within the interior walls 22 and 24.

The front wall portion is offset in an angular section 80 which extends back at an angle wall portion 82 and has a catch opening 84 therein. The catch opening 84 receives a tongue 86 of the upper container portion 12 so that it is seated in tightened juxtaposition thereto. This can be seen in FIGS. 2 and 3.

The L-shaped portion of the wall 60 has three ridge members 90, 92 and 94 which are matched to ridge members 30, 32 and 34 of the base or bottom 28.

Looking more particularly at the edge regions or the front of the side wall 22 and 24, it can be seen that splines 96 and 98 are shown. The splines 96 and 98 seat within the front wall 60 in slots to be described.

The front wall 60 has grooves or slots 100 therein. The grooves 100 receive the splines 96 and 98 therein and are indexed in part by the angular splines 68 and 70. The angular splines 68 and 70 help to space the walls 22 and 24 and provide the indexing and seating in adjacent relationship to the splines 96 and 98 or edge portion of the walls 22 and 24 in cooperation with the grooves 100 within the frontal wall portion 60.

The foregoing configuration of the front wall 60 allows for it to be bent forwardly when a plurality of electronic media members are spanned and reviewed due to the resilience thereof. Based upon the cantilever function or retention of the lower L-shaped portion 64 in the lower portion of the container 14, it can be seen that an exposure of the media is enhanced. Thus, the front wall portion 60, including the wall 62, can be bent forwardly as cantilevered and resiliently bent at the corner section 110 joining the L-shaped section of the wall 64 to the upright portion 62.

In order to seat the wall portion 60 into juxtaposition with the ledges 114 of the lower portion of the container 14, the L-shaped portion 64 is inserted into a groove, space or channel 112 provided by the ledge 114 that overlies the groove 112. As the pointed portion 66 of the L-shaped extension 64 extends inwardly into the groove, space or channel 112, it is seated therein in tightened frictional engagement by the ledge 114.

A matching ledge 118 and groove, space or channel 120 are also shown on the other side of the lower portion of the container 14.

To exemplify this further, it can be seen in FIGS. 4 and 5 wherein the ledge 114 has received the frontal portion of a tongue 64 inserted therein. It is spaced between the top and bottom inside dimensions of the groove, space or channel 112. This is due to the fact that the injection molding process heats the container significantly to the point where the space 112 or groove is enlarged. Upon seating of the L-shaped extension 64 into the interior of the groove 112, and attendant cooling, the groove 112 contracts to allow for a seating of the extension 64 in a tightened frictional engagement therewith. The tightened frictional engagement is such that the groove 112 can be firstly cooled and the tongue or extension 64 seated therein in a hard driven manner, or in the alternative, it can be implaced more readily before cooling, depending upon the wishes of a user or manufacturer.

FIG. 6 shows the L-shaped portion or tongue 64 after it has been inserted and is underlying the ledge 114 with the frontal tapered portion 66 extending thereinto. The foregoing allows for a manufacturing process so that the lower portion 114 can be injection molded with the frontal wall portion 60. Thereafter, it can be inserted into the groove 112 which is spaced sufficiently to allow the insertion thereof. After cooling, the tongue or extension 64 is gripped in a significant frictional manner to hold it therein and to allow for the cantilevered bending backwardly of the front wall 62 at corner 110 in order to expose the electronic media in the container.

Another important feature is the indexing of the side splines 68 and 70 into the interior of the side walls 22 and 24. Attendant therewith, the side walls 22 and 24 are received with their splines 96 and 98 in the grooves 100 on either side of angular splines 68 and 70. This allows for a closure in the entirety of the container where the lid portion 12 is pushed downwardly and locked with the tab or tongue 86 extending into the groove 84 for receipt thereof.

The open container can be seen in FIG. 7 wherein a perspective view is shown of the top portion of the container 12 expanded openly so that the front wall 62 of the front wall portion 60 is shown broken away to expose electronic media 130 therein. This broken away front wall configuration as seen in FIG. 7 is a substantial enhancement, as can be seen, inasmuch as all the electronic media can be scanned and viewed. Furthermore, the electronic media 130 is not bound and held tightly in place during removal, yet at the same time is held in spaced yet fixed juxtaposition for ease of view therein.

In order to enhance the opening of the container top 12 as it is moved backwardly, the back wall 26 has an inner angular portion 150 which provides a stop to the back wall 46 as it leans backwardly on the angular portion 150. This stop 150 is angled so that the top as seen in FIG. 2 bends backwardly and the back portion 46 rests against the angle 150, yet at the same time does not flip backwardly all the way. Thus, the angular inset 150 provides not only spacing but also a stop for the back of the top of the container 12, namely wall portion 46 to lean against.

In addition to the foregoing features, the top portion 12 is hinged to the bottom portion 14 by means of pintals at either side of the walls 22 and 24. A pintal 154 has been shown in FIG. 6A which is a view looking into the wall segment 24 in the area 6a.

In order to hinge the top into the pintal 154 it is seen that the top portion at 6b has its wall 40 with a dimple or depression 156 therein. The dimple or depression 156 is provided in a downward projection 158 which can be seen in FIG. 3. In effect, a pair of pintals or pins are molded into side walls 22 and 24 to receive the dimpled projection 158 and are implaced into dimples or openings 156 in the downwardly projecting portions 158 for hinged operation. The foregoing provides the two hinge points for the top 12 to open and close respectively against the bottom portion of the container 14. Thus, the entire top 12 can be hinged to the bottom portion 14 in a manner that is effective and provides for retention and maintenance of the top 12 to the bottom portion 14.

In the alternative the pintals 154 can be molded into the top in lieu of the dimples 156. The dimples in such a case are molded into the side walls 22 and 24 to receive the pintals 154. Also, in both of the alternative examples the dimples can be replaced with through holes which respectively pass completely through walls 22 and 24 or walls 40 and 42.

In addition to the foregoing, the pin or pintal configuration of the pin 154 projecting into the dimple 156 of either side of the walls 40 and 42 or in the alternative reverse arrangement as described above, allows for a snap engagement by slightly expanding the walls 22 and 24 when the walls 40 and 42 are implaced therebetween so as to be received and held in situ against the pins or pintals 154 which project into the respective dimples or holes.

The foregoing invention is a substantial step over the prior art in allowing access to the container having electronic media therein with a readily broken away frontal wall 60 that can be pulled outwardly to expose media within a container. When referring to electronic media in this application, the reference refers to all electronic storage means. These include laser and optical recording means and disks. It also extends to audio disks and digital recording means. Thus, the floppy disks of the known art as well as those 3½ inch disks in hard cases or shells are also included in the term electronic media hereof. As a consequence, this invention should be read broadly over the prior art in light of the following claims.

I claim:

1. A container molded of plastic for electronic media comprising:
   a bottom portion having surrounding walls and a base;
   a top portion hinged to the bottom portion which can be retracted backwardly for access to electronic media stored within the bottom portion;
   a frontal wall of the bottom portion which can be moved from its relationship with the bottom portion in a flexed manner in order to expose electronic media therein and space said electronic media for a view thereof when bending the wall forwardly for exposure of the electronic media having an L-shaped portion which is retained at the base of the L by the bottom portion of said container and the upright portion of the L forms at least a portion of said frontal wall and bends forwardly through the upright portion of the L-shaped portion in a cantilevered manner from said base of said L to expose electronic media therein.

2. The container as claimed in claim 1 wherein:
   said top and bottom portions are hinged to each other and split along a truncated line separating the two.

3. The container as claimed in claim 1 wherein:
   said top portion is hinged to said bottom portion by pintals extending from one portion to the other into openings for receipt thereof.

4. The container as claimed in claim 3 further comprising:
   ledges having openings thereunder in the bottom portion of said container which receive the L-shaped configuration therein for allowing the base of said L-shaped member to be received therein and the front wall to be bent forwardly against the cantilevered action of said L-shaped base being implaced under said ledges.

5. The container as claimed in claim 4 wherein:
   said top portion has a tongue, and said upright wall has an opening for receipt of said tongue therein.

6. The container as claimed in claim 5 further comprising:
   ribs along the base of said container for purposes of supporting electronic media thereon.

7. A container for electronic media comprising a rectangular boxlike configuration comprising:
   a container having a top, bottom, side walls and a front and back wall formed from plastic;
   a top portion of said container;
   a bottom portion of said container;
   means for hinging said top and bottom portions together so as to allow said top portion to fold backwardly with respect to said bottom portion;
   a frontal wall which is secured to the bottom portion along its base area and is unsecured at least in part at the edges near the corners of said rectangular box for allowing said frontal wall to be bent forwardly and expose electronic media within said container;
   splines at the edges of said front wall which provide for indexing of said front wall with respect to said bottom portion; and,
   spline portions on the leading edges of said side walls of said container for receipt within openings that have been provided in the frontal wall.

8. The container as claimed in claim 7 wherein:
   said top and bottom portions are split along an angular truncated interface.

9. The container as claimed in claim 7 further comprising:
   hinge means formed as a pin and receipt opening for hinging said top portion to said bottom portion.

10. The container as claimed in claim 7 further comprising:
    an inset angular ledge on said back wall between said top portion and said bottom portion forming a terminal point of said back wall at the interface thereof for causing said top portion to rest thereagainst when it is hinged backwardly.

11. The container as claimed in claim 10 further comprising:
    closure means between said top portion and said bottom portion formed as a respective tab and groove for holding said top portion to said bottom portion.

12. The container as claimed in claim 11 further comprising:
    indexing splines along the edges of said frontal wall which seat interiorly of said side walls for maintaining said frontal wall in relationship thereto.

13. A container for electronic media comprising a rectangular boxlike configuration comprising:
    a container having a top, bottom, side walls and a front and back wall formed from plastic;
    a top portion of said container;
    a bottom portion of said container;
    means for hinging said top and bottom portions together so as to allow said top portion to fold backwardly with respect to said bottom portion;
    a frontal wall which is secured to the bottom portion along its base area and is unsecured at least in part at the edges near the corners of said rectangular box for allowing said frontal wall to be bent forwardly and expose electronic media within said container;
    a ledge at least along a limited portion of said side walls of said base of said bottom portion of said container;
    a space between the ledge and the base; and,
    said front wall formed from the upright of an L-shaped member wherein the base extension of the L is received in the space between said ledge and the base in tightened frictional engagement so that as the frontal wall is pulled away from its corner portions, it is cantilevered from the base of the L and held in position by the overlying edges in the space provided thereby.

* * * * *